June 21, 1960
C. H. McSHAN
2,942,205
ELECTROMECHANICAL TRANSDUCER APPARATUS
AND SYSTEMS EMBODYING THE SAME
Filed March 31, 1955
3 Sheets-Sheet 1
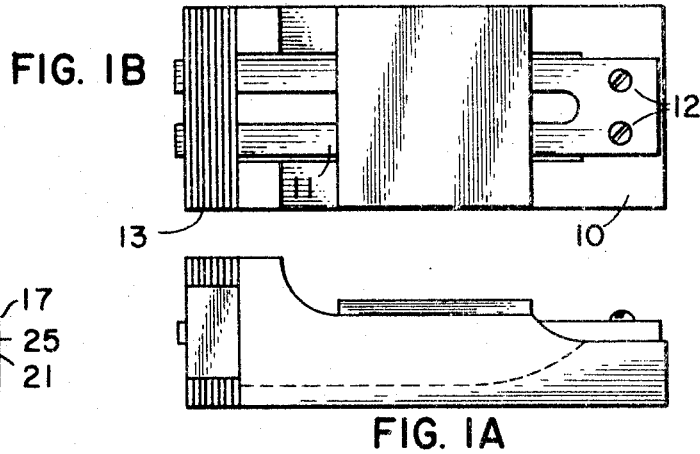
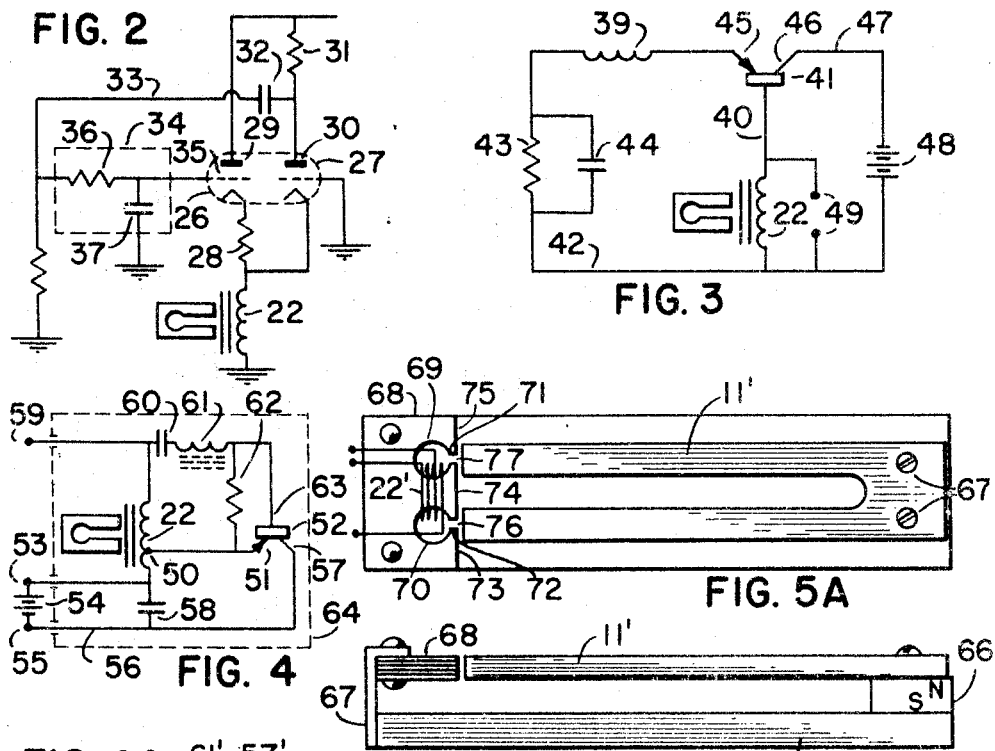
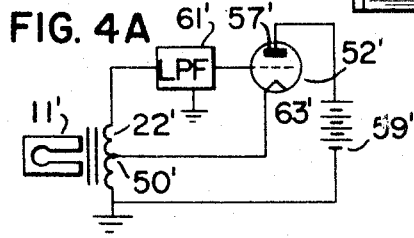
*INVENTOR.*
Clarence H. McShan
BY

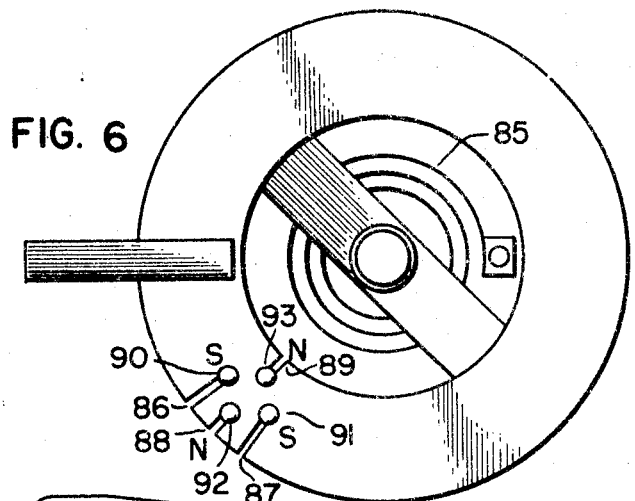
FIG. 6
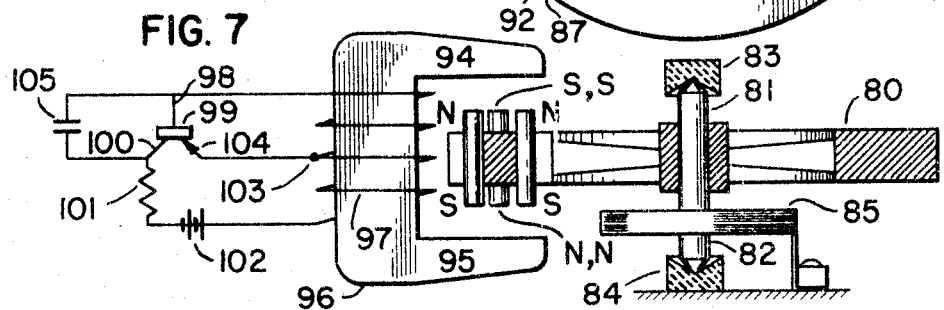
FIG. 7
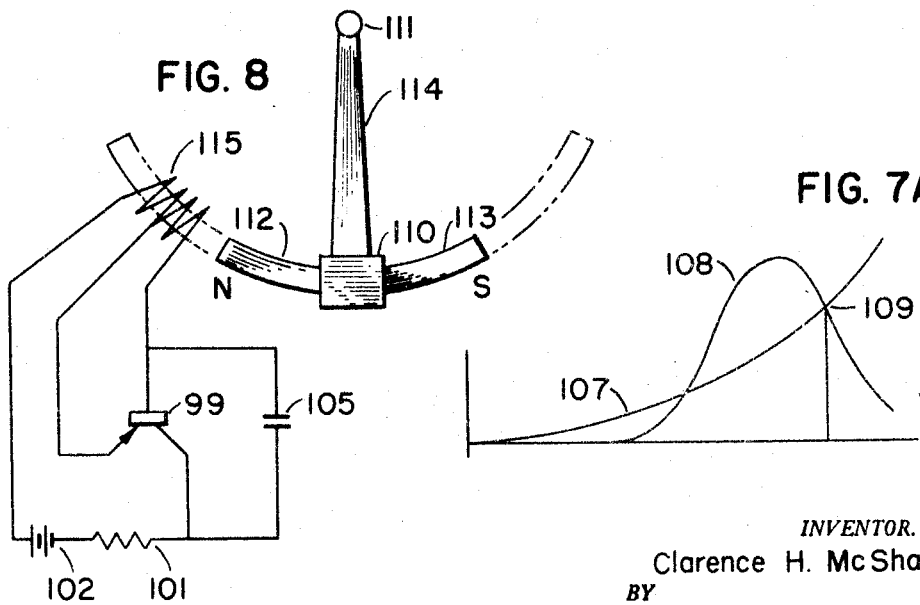
FIG. 8
FIG. 7A
INVENTOR.
Clarence H. McShan June 21, 1960

C. H. McSHAN 2,942,205

ELECTROMECHANICAL TRANSDUCER APPARATUS
AND SYSTEMS EMBODYING THE SAME

Filed March 31, 1955

INVENTOR.
Clarence H. McShan
BY

United States Patent Office 2,942,205
Patented June 21, 1960

2,942,205
ELECTROMECHANICAL TRANSDUCER APPARATUS AND SYSTEMS EMBODYING THE SAME
Clarence H. McShan, Great Neck, N.Y.
Filed Mar. 31, 1955, Ser. No. 498,180
15 Claims. (Cl. 331—116)

The present invention relates to electromechanical transducers of the class comprising a resonant or nonresonant movable member and inductor means in inductive relation to magnetic circuit means including at least a portion of the movable member for driving the latter in response to a signal input or for developing a signal output in response to mechanical movement of the movable member. More specifically, it concerns new and improved electromechanical transducer apparatus of this character which is capable of effecting an energy transfer with greater efficiency and less distortion than has previously been possible.

In electromechanical transducers that have been proposed heretofore, substantial energy losses occur in the energy conversion process that result in lowered efficiency and introduce distortion. For example, in some resonant transducers embodying tuning forks, for example, the movable member usually cooperates with a portion of the magnetic circuit to form an air gap, the length of which changes with the motion of the movable member. Therefore, in operation, the motion of the movable member produces corresponding variations in the reluctance of the magnetic circuit. Hysteresis and eddy current effects attributable to these variations in reluctance cause energy losses which tend to lower the efficiency of the device and introduce distortion. Further, electromechanical transducers of this general character usually include not only the usual interrupter type driving means, but also separate pickup means which tend to load the fork, thereby lowering its efficiency and introducing distortion.

It is an object of the invention, accordingly, to provide new and improved electromechanical transducer apparatus that is free from the above-noted deficiencies of the prior art.

Another object of the invention is to provide new and improved electromechanical transducer apparatus of the above character in which hysteresis and eddy current losses are materially reduced and distortion is minimized.

A further object of the invention is to provide new and improved electromechanical transducer apparatus of the above character which utilizes common pickup and driving means.

Still another object of the invention is to provide novel electromechanical transducer apparatus which is characterized by improved stability and which is operable at higher frequencies than can be attained by existing devices.

According to the invention, electromechanical transducer apparatus is provided in which the inductor means associated with the magnetic circuit means of which the movable member is a part is coupled to the input circuit of a device having a negative input resistance (i.e., a device in which energy is transferred from the output to the input). In the case of a nonresonant transducer, the negative input resistance of the device is preferably made substantially equal to the resistance reflected into the inductor means by the transducer, so as to compensate for energy losses occurring during the energy conversion process. With a resonant transducer such as a tuning fork, for example, the negative input resistance of the device is selected to cause the device to operate as an oscillator at the tuning fork resonant frequency. In either case, suitable precautions are taken to prevent oscillation of the device at a frequency determined by the inductance of the inductor means and any distributed capacitance associated therewith.

The invention also contemplates the provision of novel transducer apparatus in which the magnetic reluctance of the portion of the movable member in the magnetic circuit remains substantially constant and is not materially affected by the motion of the movable member so that hysteresis and eddy current losses are reduced to a minimum. Further, the inductor means associated with the magnetic circuit is relatively tightly coupled to the movable member so that the impedance or inductance of the inductor means alone can be made relatively low as compared with the impedance reflected into the inductor means by the movable member.

In one embodiment, the movable member is mounted between and in close proximity to opposed pole faces in a magnetic circuit so as to be capable of motion transversely of the air gap between the pole faces. In its motion, the movable member alters the amount of magnetic flux linking inductor means disposed in inductive relation to the magnetic circuit, without substantially affecting the magnetic flux in the movable member which remains substantially constant with movement of the movable member.

In another form, the movable member constitutes a link in the magnetic circuit and it is disposed to move transversely of an air gap between an end portion thereof and a closely adjacent portion of the magnetic circuit. Since the length of the air gap remains substantially constant in operation, the reluctance of the magnetic circuit also is substantially constant.

The invention may be better understood from the following detailed description of several representative embodiments, taken in conjunction with the accompanying drawings, in which:

Figs. 1, 1A and 1B are front, side and top views, respectively, of electromechanical transducer apparatus according to the invention in the form of an electromagnetically driven tuning fork;

Fig. 2 illustrates schematically novel oscillator means for use with electromechanical trannducers of the general character shown in Figs. 1, 1A and 1B;

Fig. 3 is a schematic diagram of a form of two terminal negative input resistance means embodying transistor means;

Fig. 4 illustrates schematically a three terminal form of negative input resistance means embodying transistor means;

Fig. 4A is a schematic diagram illustrating electromechanical transducer apparatus according to the invention embodying a single triode in a negative input resistance circuit;

Fig. 5A is a view in plan of another form of electromechanical transducer embodying a tuning fork according to the invention;

Fig. 5B is a view in side elevation of the transducer means shown in Fig. 5A;

Fig. 6 is a schematic diagram of another form of the invention utilizing an oscillating torsional member;

Fig. 7 is a plan view of the torsional mmeber shown in Fig. 6;

Fig. 7A is a graph of typical curves that are helpful in understanding the operation of the apparatus shown in Figs. 6 and 7;

Fig. 8 illustrates schematically a modification in which the resonant element is a pendulum;

Figure 9:
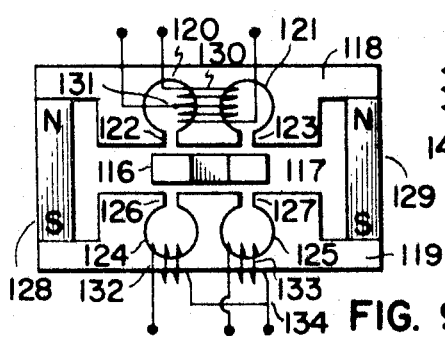
Fig. 9 is a view in elevation of turn indicator sensing mechanism constructed according to the invention.

As stated, the novel electromechanical transducer apparatus of the invention may embody either resonant or nonresonant movable members and representative forms of each type of apparatus will be described in that order herein. First to be considered will be novel resonant tuning fork transducer apparatus together with a novel circuit in which it may be incorporated according to the invention.

It is well known that the tuning fork resonator is an inherently stable and high Q device. Recent developments in special alloys having zero coefficient of stiffness enable tuning forks to be made that are accurate to one part per million over wide temperature ranges. The free space Q of such tuning forks ranges from 16,000 to 25,000 in a vacuum, which is better than most quartz crystals and equivalent to a good clock pendulum.

Figs. 1, 1A and 1B illustrate typical tuning fork apparatus according to the invention which enables the above-noted desirable properties of the tuning fork resonator to be very closely approximated in practice. By virtue of the novel structure shown, no substantial reduction of the inherent high Q of the fork occurs, nor is the fork subjected to undesirable forces that might impair its stability. As shown in Fig. 1B, the apparatus comprises a substantially U-shaped base member 10 having a conventional tuning fork 11 secured thereto in any suitable manner as by the screws 12, for example.

Secured at the free ends of the base member 10 is magnetic circuit means 13 comprising opposed pole structures 14 and 15 having magnetomotive force generating means such as the permanent magnets 16 and 17 interposed therebetween. The pole structure 14 is provided with parallel bores 18 and 19 extending longitudinally of the fork 11 and communicating with longitudinal slots 20 and 21, respectively, which are adapted to receive inductor means 22 such as a coil, for example. The pole structure 14 is also provided with flat pole faces 23, 24 and 25 which lie substantially parallel to the upper surfaces of the tines of the tuning fork 11. Similar coil receiving bores and slots are provided in the pole structure 15 in which other inductor means may be received as required in certain applications to be described below.

The pole structures 14 and 15 are preferably made of suitable high permeability magnetic material laminated for minimum eddy current losses in accordance with good engineering practice. Further, the bores 18 and 19 and the coil 22 are disposed symmetrically about the vertical axis of symmetry of the tuning fork 11. Also, the coil slots 20 and 21 are positioned so that they are symmetrical about the vertical center lines through the tines of the tuning fork 11, respectively, and the design is such that the magnetic reluctance of the paths at points equal distances on opposite sides of the tine center line is substantially the same. Under these conditions, the motion of each tine of the fork 11 will cause the relative amounts of magnetic flux through magnetic paths inside and outside the coil 22 to vary so that an emf will be developed in the coil 22. Conversely, if an alternating signal of the same frequency as the fork 11 is impressed upon the coil 22, it will cause motion of the tines of the tuning fork.

The average reluctance of the differential flux paths is substantially constant with tine deviation so that the flux through the fork is practically constant and magnetic losses in its solid material are avoided. Flux variations occur only in the low loss laminated material of the pole structures 14 and 15. The nonlinear reluctance characteristics of the individual differential flux paths formed by the material defining the slots 20 and 21 combine inversely to form a composite characteristic that is substantially linear. Further, with the magnetic field normal to the motion of the tines and with equal gap spacing above and below the tines, the resultant stress upon the fork in the vertical plane is substantially zero. Under the current commercial tolerance practices now in effect, it can be kept under 1% of that exhibited under similar conditions in conventional electrically driven tuning forks in which the fork is driven by a member positioned at one side of a tine.

It will be evident that the coupling between the tuning fork 11 and the coil 22 in Figs. 1, 1A and 1B is tight so that the emf generated per turn of the coil 22 will be high. This is important since it enables the impedance or inductance of the coil 22 alone to be made low as compared with the resonant impedance generated in the coil by the tuning fork 11. In a practical case with the apparatus in a vacuum, this ratio can be made about 1 to 300 so that for all practical purposes the system behaves like a parallel resonant circuit having Q equal to that of the tuning fork 11. According to the invention, the terminals of the coil 22 are connected to the input of a device having sufficient negative input resistance to overcome the positive resistance reflected into the coil 22 by the tuning fork 11 so that sustained oscillations will be generated. Thus, this form of transducer apparatus according to the invention embodies both pickup and drive mechanism and is, in its simplest form, a two terminal device.

A typical negative input resistance device that may be used with the apparatus shown in Figs. 1, 1A and 1B is illustrated in Fig. 2. It comprises a pair of triodes 26 and 27 which may be in a single envelope as in the type 12AU7 tube, for example. The cathode of the triode 27, and the cathode of the triode 26 in series with a cathode resistor 28 are connected to one terminal of the coil 22 in the transducer apparatus of Fig. 1, the other terminal of which is grounded as shown in Fig. 2.

The plate 29 of the triode 26, and the plate 30 of the triode 27 in series with a plate resistor 31 are connected to the positive terminal of a 250 volt plate supply. The plate 30 of the triode 27 is connected through a blocking condenser 32, a conductor 33 and a low pass filter 34 to the control grid 35 of the triode 26. The low pass filter 34 may include a series resistor 36 and shunt capacitor 37 and it serves a purpose to be described later.

It will be understood that the circuit shown in Fig. 2 with the proper values of circuit components to provide sufficient negative input resistance to overcome the resistance reflected into the coil 22 by the tuning fork 11 will oscillate at the resonant frequency of the tuning fork 11.

According to the invention, means is provided for preventing the circuit from oscillating at a resonant frequency (usually much higher than the resonant frequency of the fork) determined by the inductance of the coil 22 and its distributed capacity. This may be done in a number of different ways as, for example, by destroying the Q of the high frequency resonant circuit; by providing an attenuation network to lower the gain of the feedback loop at frequencies above the audio range; by using in the feedback loop only enough gain to insure oscillation at the fork frequency; or by combinations of these three procedures.

In Fig. 2, suppression of the undesired oscillations is effected by the low pass filter 34 including the series resistor 36 and the shunt capacitance 37 in the feedback loop. The low pass filter 34 might also be designed to introduce appropriate phase shift to secure a degenerative condition at the undesired higher frequency. The regenerative circuit should be effective over a band of frequencies so as not to present a short circuit or loading effect on the tuning fork at its overtones, or load the distortion products generated in the transducer itself. Under these conditions, the oscillator will oscillate correctly with good efficiency and minimum distortion at the frequency determined by the tuning fork.

When isolation or the purest waveform is required, the signal output may be taken from a secondary winding (not shown) in the slots provided in the magnetic structure 15 (Fig. 1) for this purpose.

The electromechanical transducer apparatus shown in Figs. 1, 1A and 1B may also be used with the simple form of oscillator shown in Fig. 3 which utilizes a transistor such as the type 2N32, for example. In this figure, the coil 22 of Fig. 1 has one terminal connected to the base 40 of the transistor 41. The other terminal of the coil 22 is connected by a conductor 42 in series with a resistor 43 and a capacitor 44 in parallel to the emitter 45 of the transistor 41, a choke 39 serving to suppress oscillations at the electrical resonance frequency, as described above. The collector 46 of the transistor 41 is connected by a conductor 47 to the negative terminal of a suitable source of voltage 48, the positive terminal of which is connected to the lower end of the coil 22. The output of this form of oscillator is taken across the coil 22 and appears at the terminals 49. This type of circuit is suitable where the transistor has a current gain ($\alpha$) greater than unity.

Fig. 4 illustrates another form of transistor circuit which may be used where the transistor has a current gain ($\alpha$) less than unity. In this embodiment, the coil 22 is provided with a tap 50 which is connected to the emitter 51 of the transistor 52 and one of its outer terminals is connected to a terminal 53. A source of electrical energy 54 is connected to the terminal 53 and to a terminal 55 which is connected by a conductor 56 to the collector 57 of the transistor 52. Filter means, such as a condenser 58, is connected in parallel with the source of electrical energy 54 to provide a low impedance path for the A.C. signal. The other terminal of the coil 52 is connected to an output terminal 59 and through a series condenser 60 and a choke coil 61 to the base 63 of the transistor 52, a resistor 62 being connected from the base 63 to the emitter 51. The choke coil 61 serves to prevent the system from oscillating at a frequency determined by the inductance of the coil 22 and the distributed capacity in parallel therewith. However, it does not in any way impair oscillation of the system at the frequency of the tuning fork associated with the coil 22.

In a practical case, the system shown in Fig. 4 may comprise a type CK-722 transistor 52 having a common collector and a current gain ($\alpha$) less than unity. Preferably, the system is enclosed in an evacuated envelope 64. Under these conditions, for a power input of 2 milliwatts an output of 0.25 volts at minus 43db total distortion has been obtained with an operating Q of 12,500.

In Fig. 4A, a conventional triode 52' is used in a three terminal negative input resistance circuit of the type shown in Fig. 4. The anode 57' of the triode 52' is connected in series with a source of plate supply 59' to one terminal of the coil 22'. The other end terminal of the coil 22' is connected to the control grid 57' of the triode 52' through a conventional low pass filter 61' which serves to suppress oscillations at any frequency than the natural resonance frequency of the resonator 11'. The cathode 63' of the triode 52' is connected to a tap 50' on the coil 22. Operation of this circuit is quite analogous to the circuit of Fig. 4 and further description thereof will not be necessary.

Figs. 5A and 5B illustrate another form of electromechanical transducer apparatus according to the invention. In this embodiment, a base member 65 made of suitable magnetic material has secured at one end thereof permanent magnet means 66 on which is mounted a tuning fork 11', screws 67 or any other suitable means being employed for this purpose. At the other end of the base member 65 is secured an upright member 67, also made of magnetic material, which carries a laminated pole structure 68. As in Fig. 1, the pole structure 68 is provided with bores 69 and 70 extending perpendicularly of the base member 65 and communicating with slots 71 and 72, respectively, which are centered on the center lines of the two tines of the tuning fork 11'. A coil 22' is mounted in the bores 69 and 70, as shown. The magnetic structure 68 also has pole faces 73, 74 and 75 which lie parallel to the adjacent faces of the tuning fork tines and are spaced therefrom by narrow air gaps 76 and 77, respectively.

It will be understood that the average magnetic reluctance of the differential paths on opposite sides of each of the slots 71 and 72 is substantially constant with tine deviation. Hence, while the number of magnetic lines of force linking the coil 22' varies periodically with the vibration of the fork 11', the magnetic flux density in each of the tines remains substantially constant so that hysteresis and eddy current losses are kept at a minimum. This embodiment functions in essentially the same manner as that shown in Fig. 1 and it may be connected in oscillator circuits of the type shown in Figs. 2, 3 and 4, as described above.

The conventional side drive for tuning forks will serve both the driving and pickup functions when connected to an oscillator like one of those shown in Figs. 2, 3 and 4 of the drawings. However, because of the usual low ratio of winding inductance to fork resonant impedance as reflected into the winding, the oscillator circuit must be very carefully designed in order to suppress the unwanted high mode of oscillation and at the same time secure in the feedback loop a gain greater than unity at the fork resonant frequency with reasonable efficiency.

Because of the inherent low distortion and tight coupling of the electromechanical transducer apparatus shown in Figs. 1 and 5A, this apparatus is of particular utility for filtering purposes. As indicated above, the resonant impedance reflected into the winding on the transducer by the tuning fork resonator can be made as much as 300 times the inductive impedance of the winding itself. Hence, the off-resonance rejection of the device used as a parallel circuit would approach —50db. Electrically, therefore, the electromechanical transducer apparatus of the invention can be regarded as a pure parallel resonant circuit and can be used for filtering purposes in any of the usual ways.

As a filter, the coil 22 can be center tapped to secure balanced or push-pull operation, or it may be used in a bridged T network. It may also be employed in the same manner as conventional lattice or ladder type filters. If desired, more than one resonant element may be used with a common drive, in order to obtain a plurality of resonant conditions, as required in certain applications. For example, it would be possible in this way to secure the electrical equivalent of staggered tuning, or of overcoupling for purposes of wider band pass or rejection with steeper skirts.

For operation at low frequencies (i.e., from about 1 to 150 cycles per second) resonant electromechanical transducer apparatus of the type shown in Figs. 6 and 7 may be employed. Here the mechanical resonator may comprise, for example, the usual balance wheel 80 of a clock movement mounted on pivots 81 and 82 journalled in jeweled bearings 83 and 84, respectively. The usual spring 85 maintains the wheel 80 normally in a reference position, and applies a force varying linearly with displacement for returning the wheel to its reference position whenever it is displaced therefrom.

The balance wheel 80 is made of a suitable non-magnetic material such as brass, for example, and it is provided with a plurality of axial slots 86, 87, 88 and 89 in the rim thereof in which are received a plurality of permanent magnets 90, 91, 92 and 93, respectively, preferably having the alternate north and south polarities indicated on the Figs. 6 and 7. The portion of the rim including these permanent magnets is adapted to swing between the opposed poles 94 and 95 of a soft iron stator 96 carrying a winding 97. The upper end of the winding 97 is connected to the base 98 of a transistor 99, the collector 100 of which is connected in series with a resistor 101 and a battery 102 to the lower terminal of the winding 97. The winding 97 has a midtap 103 which is connected to the emitter 104 of the transistor 99. A capacitor 105 is connected from the base 98 to the collector 100, as shown.

The transistor 99 is preferably biased to cut-off by the battery 102 which may be a conventional mercury cell providing a voltage of 1.35 volts, for example. The resistance 101 serves to limit the current in the transistor 99.

In operation, the wheel 80 is given a displacement away from the reference position determined by the spring 85. As the magnets 90, 91, 92 and 93 in the periphery of the wheel 80 enter the gap between the pole pieces 94 and 95, magnetic flux variations are produced in the stator 96 which induce a voltage wave in the winding 97. This voltage wave is applied to the base 98 of the transistor 99 in the proper manner to give a positive going voltage rise when the magnets enter the gap and a negative going voltage as the magnets leave the gap or vice-versa. Since the transistor 99 is biased to cut-off, the positive going base voltage will cause conduction and reenforcement of the signal generated in the pickup winding 97, developing a winding current which in turn acts to exert a pulling or repelling force on the magnets 90, 91, 92 and 93.

As the magnets continue through the air gap, the peak magnetic flux is reached and the voltage generated in the winding 97 reverses, causing cut-off of the transistor 99. As a result, the net retarding force of the soft iron stator 96 upon the magnets 90, 91, 92 and 93 as the latter leave the air gap will be less than the pull-in repelling force on the magnets in entering the air gap by the amount of the regenerative force developed by the transistor 99, as described above. Hence, a net power gain will occur on oscillatory entry of the magnets into the air gap from either direction. This net power gain is sufficient to overcome the energy losses in the apparatus so that the wheel 80 will continue to oscillate at its natural resonant frequency. An electrical output of corresponding frequency may be taken off at the terminals of the winding 97.

Since the peak-to-peak oscillation of the balance wheel 80 may be as much as 720°—2θ where θ is the angle subtended by the magnets 90, 91, 92 and 93, the impulse can be made short as compared to the period of the balance wheel 80. Hence, the rate of change of magnetic flux in the stator 96 will efficiently generate in the winding 97 a large enough voltage at the point of maximum velocity of the balance wheel 80 to trigger the transistor 99 when biased to cut-off by the 1.35 volts supply 102. Due to regeneration, this voltage will build up until limiting action occurs in the transistor 99. Any tendency of the balance wheel 80 to increase its amplitude of oscillation is prevented not only by this limiting action but also by decreased overall efficiency of the transistor 99 as the limiting action becomes more severe.

The operation of the system shown in Figs. 6 and 7 may be better understood from Fig. 7A which is a graph of a typical curve 107 of the power dissipation in the balance wheel as a function of the amplitude of oscillation and the curve 108 represents the transistor power output also as a function of the amplitude of oscillation. The correct operating point for the conditions described above is represented by the reference character 109 on the negative slope of the transistor power output curve 108 where the latter crosses the balance wheel dissipation curve 107. Under these conditions, the transistor circuit acts as a fusee to regulate the amplitude of oscillation with changes of efficiency of movement due to position and temperature. The device, of course, is not self-starting but must be shaken like any ordinary watch or clock to start oscillation.

It will be understood that the apparatus shown in Figs. 6 and 7 provides a pulse output which is of particular utility in timing applications where timekeeping gear train is absent. The electrical output of the apparatus may be used to synchronize or operate slave clocks. Further, the pulse output of the apparatus is well adapted for use in regulating a time piece such as a watch, for example.

Low frequency electromechanical transducer apparatus according to the invention may also be formed by using as a mechanical resonator a conventional meter movement having a pivotally mounted coil between the field poles of a permanent magnet, any short-circuited damping turn being, of course, removed. By connecting the moving coil of a meter movement of this type to one of the several forms of negative input resistance devices described herein with suitable low pass means in the feedback path to prevent spurious oscillations at undesired frequencies, low frequency oscillations at the resonant frequency of the mechanical system can be sustained.

Fig. 8 illustrates another form of invention in which the mechanical resonator is a conventional clock pendulum. In this figure, a pendulum 110 is mounted for free movement on a pivot 111 and it comprises arcuate rods 112 and 113 made of magnetic material and polarized north and south, respectively, as indicated, mounted at the lower end of an arm 114. The arcuate rod 112 is adapted to move into and out of a solenoid 115 which is connected in a negative input resistance device substantially like that shown in Fig. 7.

In a typical form of the apparatus shown in Fig. 8, the transistor 99 may be a type CK722 transistor, the resistor 101 may have a value of 3,000 ohms and the capacitor 105 may have a value of 0.1 mfd. With a coil 115 having sufficient turns to develop 0.4 volt peak-to-peak open circuit with the pendulum 110 swinging normally, regeneration in the transistor circuit produces a 1.4 volt peak-to-peak voltage in the coil 115. This exerts a force on the pendulum 114 which keeps it in motion to drive the gear train in a conventional clock movement (not shown), for example. The peak current from the battery 102 is 0.18 ma., the duty cycle is about 20% so that the average current is 0.036 ma. at 1.5 volts, corresponding to .054 mw/sec., or 540 ergs/sec. The resistor 101 and the capacitor 105 serve the dual function of stabilizing the transistor 99 and preventing spurious electrical oscillations.

For optimum efficiency, the coil 115 should be made of a large number of turns of very fine wire so that its resistance will be large enough to enable the resistor 101 to be eliminated. Where this is done, the coil 115 can be very small in physical size and the efficiency of the energy conversion very high.

While the system shown in Fig. 8 will operate with some spurious electrical operations present, these introduce additional losses and present problems of stabilization. Hence, it is preferred to take precautions as described above, in order to suppress any such high frequency electrical oscillations.

Figure 10:
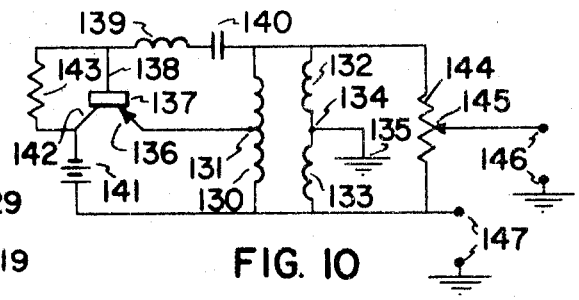
Fig. 10 is a schematic diagram of a typical circuit in which the mechanism of Fig. 9 may be embodied.

The invention may also be embodied in tuning fork turn indicator sensing means as shown in Figs. 9 and 10 according to the invention. In Figs. 9 and 10, a tuning fork 116 is anchored directly to an object for the purpose of detecting any turning movement thereof about the longitudinal axis of the fork. The tines of the fork 116 are adapted to vibrate in an air gap 117 between opposed laminated pole structures 118 and 119. The pole structure 118 is provided with winding channels 120 and 121 communicating with slots 122 and 123, respectively. Similarly, the pole structure 119 is provided with winding receiving channels 124 and 125 which communicate with slots 126 and 127, respectively. Between the pole structures 118 and 119 are disposed permanent magnets 128 and 129.

The channels 120 and 121 carry a winding 130 having a center tap 131 and the channels 124 and 125 carry the windings 132 and 133, respectively, which are connected in series and have a common junction 134. As best shown in Fig. 10, the winding 130 and the windings 132 and 133 are connected in parallel, the junction 134 being grounded at 135. The tap 131 is connected to the emitter 136 of a transistor 137. The base 138 of the transistor 137 is connected through a choke coil 139 and a capacitor 140 to one end terminal of the coil 130. The other end terminal of the winding 130 is connected in series with a source of electrical energy 141 to the collector 142. A resistor 143 is connected from the collector 142 to the base 138. Connected in parallel with the coils 132 and 133 is a potentiometer 144 having an adjustable tap 145 connected to an output circuit represented by the terminal 146. The lower end of the potentiometer 144 is connected to a second output circuit represented by the terminal 147.

The tapped winding 130 is excited by the transistor circuit described to sustain the fork in lateral vibration. The impedances of the windings 130, 132 and 133 are such that the regenerative action of the transistor circuit produces equal drive action from the pole structures 118 and 119.

In operation, the potentiometer 144 is adjusted so that there is no output at the terminals 146 so long as the object on which the sensing device is mounted is at rest or is being translated rectilinearly. As soon as the motion of the object causes the tuning fork to turn about its longitudinal axis, the fork is set into torsional vibration and the tines are given a component of vibration towards and away from the pole structures 118 and 119. This modulates the inductance of the windings 132 and 133 in inverse relationship and at a frequency $f_t$ determined by the turn rate. In the modulation process, the electric signal of frequency $f_0$, the natural resonance frequency of the fork, acts as the carrier and sidebands $(f_0 \pm f_t)$ are generated. The modulation appears at the terminals 146 and the carrier at the terminals 147. These signals may be utilized in known devices (not shown) to provide indications of turn rate, turn acceleration and direction.

Figure 11:
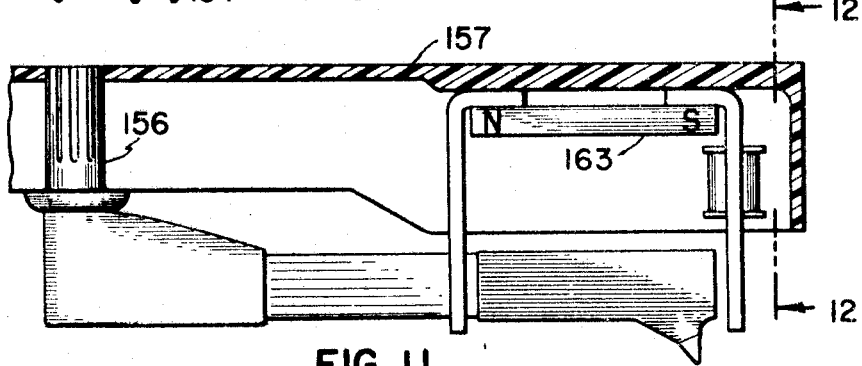
Fig. 11 is a side view taken along the line 11—11 of Fig. 13 illustrating phonograph pickup mechanism constructed according to the invention.
Figure 13:
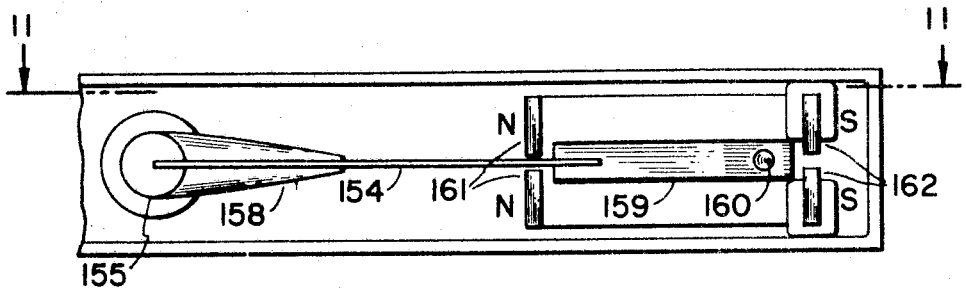
Fig. 13 is a bottom view of the phonograph pickup apparatus shown in Figs. 11 and 12.
Figure 12:
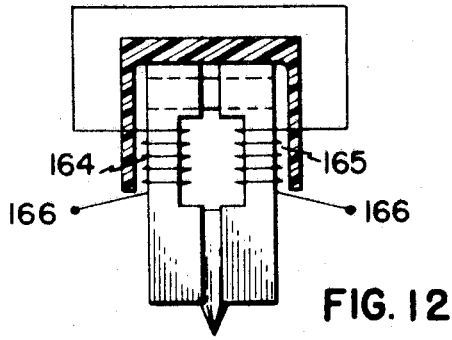
Fig. 12 is a front view in section taken along the line 12—12 of Fig. 11.

The novel electromechanical transducer apparatus of the invention may also be embodied effectively in nonresonant vibratory devices such as phonograph pick-ups, for example. Thus, a typical phonograph pick-up embodying the invention is illustrated in Figs. 11, 12 and 13. In these figures, a nonmagnetic vibratory member 154 made of a suitable material, such as phosphor bronze, for example, is secured to a rod-like support member 155 which is adapted to be plugged into a socket 156 in a conventional phonograph tone arm 157, for example. The vibratory member 155 may be provided with suitable plastic damping material 158 in accordance with the usual practice.

At the free end of the vibratory member 154 is a mass 159 which may be made of soft iron, for example, and which has a conventional phonograph stylus or needle 160 secured at the underside thereof. The mass 159 is adapted to vibrate transversely of opposed split pole structures 161 and 162 mounted at the opposite ends of a permanent magnet 163. The pole structure 162 may carry a pair of windings 164 and 165 which are connected in series, as shown, to output terminals 166.

It will be readily apparent that as the stylus 160 vibrates in a record groove, vibration of the mass 159 will cause variations in the magnetic lines of flux linking the coils 164 and 165. However, it can be shown that the average magnetic reluctance in the magnetic path remains substantially constant, so that hysteresis and eddy current losses are kept to a minimum.

In operation, photograph pick-up apparatus of the type shown in Figs. 11, 12 and 13 may be connected in circuit with one of the several types of amplifiers described above, including means for preventing oscillation at the resonant frequency determined by the inductance of the coils 164 and 165 and any stray capacity in the circuit.

For example, if an oscillator of the type shown in Fig. 4 is used, the tap on the coil 50 should be adjusted for a gain less than unity and the transistor 52 should be set to its very broad maximum value. This will provide relatively stable regeneration capable of effectively reducing or overcoming various mechanical hysteresis and damping effects, thus raising the compliance of the stylus many times.

While the compliance over the audio range will probably be very nonuniform, the minimum value will be several times the nonregenerative condition and the mechanical input impedance at the needle tip will be several times the driven mechanical impedance of the record groove. Therefore, the combination of low groove impedance tightly coupled to a regenerative electrical system of high input impedance will insure that the output signal will be determined by the record groove.

If desired, new alloy core materials may be employed to provide uniform and relatively high compliance over the audio range. Alternatively, mechanical and electrical compensation may be utilized to secure an inexpensive pick-up of high mechanical compliance.

In the several embodiments described, it may be possible to dispense with separate resistors and capacitors in the circuit by building the proper resistance and capacitance values into the transducer winding. Thus, the capacitance of the winding might be increased by using a center-tapped bifilar winding, the two halves being properly connected to add their induced voltages. Resistance may be increased by using conductors of resistive alloy for the winding, instead of copper. The apparatus thus might be reduced to a special coil, a transistor and a battery. The resistance may stabilize the transistor for D.C.; provide temperature compensation; lower the Q of the winding; and may provide sufficient attenuation in the feedback loop to prevent electrical oscillation at undesired frequencies.

The invention thus provides novel and highly effective electromechanical transducer apparatus of the type comprising a movable mechanical member in a magnetic circuit and inductor means in inductive relation to the magnetic circuit. By connecting the inductor means to the input of a negative resistance input device provided with means for suppressing oscillation at undesired frequencies compensation may be made for energy losses and loading so that mechanical energy may be converted to the electrical form and vice-versa with high efficiency. Further improvement in this direction is achieved by providing close coupling between the inductor means and the movable mechanical member with a magnetic path of substantially constant magnetic reluctance.

It will be understood that if the restoring spring 85 in Fig. 7 were eliminated and alternate North and South pole magnets were placed around the balance wheel 80, the latter would spin rather than oscillate. It would thus provide a brushless D.C. motor that would be suitable for light loads as in gyroscopes, for example.

While the invention has been described herein in a number of typical forms, it will be understood that it can be embodied in a wide variety of other apparatus such as resonant relays, signal choppers, mechanical and magnetic modulators, reed meters, multiple tone generators, variable frequency units and other resonant and nonresonant apparatus. Further, the specific embodiments described herein are susceptible of variations in form and detail within the scope of the invention. For example, in the several tuning fork devices described herein, the drive may be applied to only one tine instead of two. Also, in the embodiments including resonators a small signal of appropriate frequency may be injected at the base of the driving element for synchronizing purposes, if desired. Other modifications will be apparent to persons skilled in the art. Therefore, the invention is not to be restricted to the specific devices disclosed but comprehends all such modifications as fall within the scope of the appended claims.

I claim:

1. An electromechanical transducer system comprising an amplifier having an input and an output, a transducer for bidirectionally transducing mechanical motion and electrical energy and including a magnetic circuit and an inductor linking the magnetic circuit, at least a portion of the inductor being common to the amplifier output and input for regenerative feedback of both electrical energy induced in the inductor as a result of mechanical motion in the transducer and electrical energy from the amplifier output, the electrical energy tending to sustain mechanical motion in the transducer, and means for rendering the system electrically stable against self-oscillation in the absence of mechanical motion in the transducer and against oscillation at any frequency other than that of the transducer mechanical motion when such motion is present, whereby the system is governed exclusively by the said mechanical motion.

2. An electromechanical transducer system as in claim 1 in which all of the inductor is common to both the input and the output of the amplifier, and the means rendering the amplifier non-oscillatory is in a feedback path in the amplifier.

3. An electromechanical transducer system as in claim 1 in which the amplifier comprises a transistor of current gain greater than unity having an emitter base circuit and a collector base circuit and the inductor is common to both of said circuits.

4. An electromechanical transducer system as in claim 1 in which the inductor comprises two mutually coupled portions connected to the amplifier input and output, respectively.

5. An electromechanical transducer system as in claim 1 in which the amplifier includes a transistor of gain less than unity and having base, emitter and collector terminals, and the inductor comprises two mutually coupled portions, one connected to two of said terminals, and the other connected to the third terminal and to one of said two.

6. An electromechanical transducer system as in claim 1 in which the transducer includes a movable member having a natural frequency of mechanical resonance.

7. An electromechanical transducer system as in claim 1 in which the motion in the transducer involves a rotatable member.

8. An electromechanical transducer system as in claim 1 in which the transducer comprises a magnetic circuit including at least two magnetic paths, and a mechanical member made of magnetic material and mounted for movement transversely of said magnetic paths to modify the magnetic reluctance thereof substantially inversely, the inductor being disposed in inductive relation to at least one of said paths.

9. An electromechanical transducer system as in claim 1 in which the transducer comprises a magnetic circuit having a narrow air gap formed by flat pole face means parallel and in closely spaced relation to the coplanar pole faces on three adjacent pole elements, the inductor being wound on the central one of the three pole elements, means establishing magnetomotive force in said magnetic circuit and a tuning fork having parallel spaced apart tines disposed in said air gap with the flat opposite faces thereof parallel and in closely spaced relation to said respective pole faces and pole face means, each tine spanning the gap between said central pole face and an adjacent pole face.

10. An electromechanical transducer system as in claim 1 in which the transducer comprises a magnetic circuit including a mechanical resonator having a face and a pair of pole elements having coplanar pole faces parallel and in closely spaced relation to said resonator face, said resonator face spanning the gap between said pair of pole elements, the inductor being mounted in inductive relation to at least one of said pole elements.

11. An electromechanical transducer system as in claim 1 in which the transducer has a frequency of natural mechanical resonance and means is provided for modulating the output of the transducer.

12. An electromechanical transducer system as in claim 1 in which the transducer includes a vibratable member, the inductor being adapted to have electromotive force induced therein in response to rectilinear vibration of said vibratable member, and a second inductor mounted in inductive relation to said vibratable member so as to have electromotive force induced therein in response to torsional vibration of said vibratable member, the inductors being connected in circuit for modulation of one of the induced electromotive forces by the other.

13. An electromechanical transducer system as in claim 1 in which the transducer comprises magnetic circuit means including a plurality of opposed pole elements having opposed pole faces defining an air gap of uniform width, tuning fork resonator means mounted with its tines in said air gap for vibration therein substantially parallel to said pole faces, one side of each of said tines spanning the gap between a central pole element and an adjacent pole element, and the other side of each of said tines spanning the gap between a central pole element and an adjacent pole element on the opposite side of said air gap, the inductor being mounted on one of said central pole elements, and second and third inductor means being mounted on said magnetic circuit means between the central pole element on the opposite side of the air gap and the adjacent pole elements on either side thereof, respectively, together with voltage divider means connected in parallel with said second and third inductor means in series, and output means connected to the junction between said second and third inductor means and a tap on said voltage divider means.

14. An electromechanical transducer system as in claim 1 in which the transducer includes a vibratable member carrying a phonograph record stylus.

15. An electromechanical transducer system as in claim 1 in which the transducer comprises magnetic circuit means having at least two spaced apart magnetic pole elements, a resilient arm fixed at one end and having at its other end a member made of magnetic material and having a flat surface substantially parallel and close to said pole elements and spanning the gap therebetween, the inductor being carried by at least one of said pole elements, a record stylus carried by said member, and means establishing a steady magnetomotive force in said magnetic circuit means.

References Cited in the file of this patent

UNITED STATES PATENTS

| | | |
|---|---|---|
| 2,709,749 | Smith | May 31, 1955 |
| 2,769,946 | Brailsford | Nov. 6, 1956 |
| 2,770,734 | Reek | Nov. 13, 1956 |

FOREIGN PATENTS

| | | |
|---|---|---|
| 155,854 | Great Britain | Jan. 6, 1921 |
| 1,090,564 | France | Oct. 20, 1954 |